Figure 1:
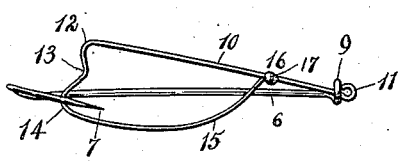

J. OSMOND.
FISH HOOK.
APPLICATION FILED OCT. 2, 1909.

984,596.

Patented Feb. 21, 1911.

Witnesses:
Chas. F. Bassett
M. A. Milord

Inventor
John Osmond
By Frederick Benjamin
Atty.

UNITED STATES PATENT OFFICE.

JOHN OSMOND, OF CHICAGO, ILLINOIS.

FISH-HOOK.

984,596.

Specification of Letters Patent. Patented Feb. 21, 1911.

Application filed October 2, 1909. Serial No. 520,656.

*To all whom it may concern:*

Be it known that I, JOHN OSMOND, citizen of the United States, residing at Chicago, in the county of Cook and State of Illinois, have invented certain new and useful Improvements in Fish-Hooks, of which the following is a specification.

My invention relates to fishing tackle and has especial reference to fish hooks of that type in which provision is made for protecting or guarding the point, such hooks being commonly designated as weedless hooks.

The chief objects of the improvements which form the subject matter of this application for patent are:—to provide a simple and effective device for protecting the point of a fish-hook so arranged as to prevent the engagement of the hook with weeds or other debris while the hook is being used for angling; to furnish a guard for the point of a hook that will be efficient for the purpose intended without interfering with the hooking of the fish, and to provide a weed guard that can be readily placed in operative position with relation to the hook point.

Other objects of the invention are:—to provide a rigid guard for a fish hook, so arranged that it will be easily dislodged by a comparatively slight force so that the hook will be bared at the slightest touch of the fish's jaws, rendering the device positively operative whenever taken into the mouth of the fish; to furnish a contrivance for the purpose stated that will be equally effective whatever the position of the hook relatively to the mouth of the fish, and to construct a weed guard in such a manner that it will become freed from the retaining member when pressure is made upon any part of the guard.

Very important features of my improved weed guard lie in the manner of utilizing the resiliency of the fish hook to which it is applied to removably retain the said guard in its protective position, and the pivotal manner of mounting the guard which permits the advantageous application of the dislodging force, the point of pressure affording a leverage that will insure a quick action under the influence of the spring of the hook.

I accomplish the desired results by means of the device illustrated in the accompanying drawing, which forms a part of this application, the details of construction and manner of operation being disclosed in the following views:—

Figure 2:
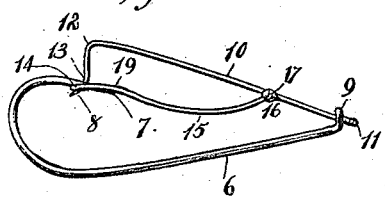
Figure 3:
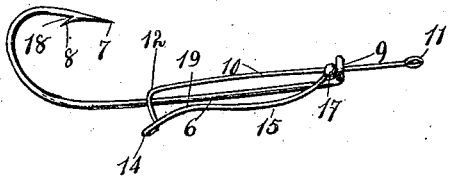
Figure 4:
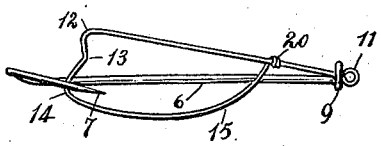

Figure 1 is a top plan view of my improved weedless fish hook, with the guard in operative position; Fig. 2 is a side elevation, with the parts in the same relation as in Fig. 1; Fig. 3 is a side elevation of the device with the guard dislodged from its operative position and retracted until its stop engages the eye of the fish hook; Fig. 4 is a top plan view showing a slight modification in the manner of connecting the bow of the guard to the shank, and Fig. 5 is a front end elevation of the device with the guard in operative position.

Referring to the details of the drawing, the numeral 6 indicates the shank, 7 the point, 8 the barb and 9 the eye of a fish hook of usual form in every respect except that the eye, which usually has its plane in line with the shank, is bent up at a right angle with the said shank, in the manner shown in the drawing. It will be noted that said eye 9 is bent toward the side upon which the point of the hook is arranged, and through this eye is passed the rear end of a weed guard formed of a single piece of wire and comprising a straight portion or shank 10, which is the part threaded through the eye 9, as aforesaid, having its rear end bent into an eye 11. This eye serves to prevent the shank from being drawn forward through the eye 9, and also forms an attachment for the usual line and swivel (not shown). The said shank then passes forward to a suitable distance and is then bent sharply downwardly as indicated at 12, and again bent at 13 in a horizontal direction. A third bend 14 somewhat wider than those previously mentioned forms a curve, which, from its function, is termed the barb loop. From this loop the wire of the guard is continued backward forming a curve or bow 15, and the end of the wire is attached to the shank at the point 16 by coiling the extremity about the shank and then securing the connection by any suitable means, preferably by the use of solder, as indicated at 17. The guard thus formed and made of suitable material will be comparatively stiff and rigid, and is so proportioned that when the device is drawn forward to bring the eye 11 of the guard into engagement with the eye 9 of the fish hook the loop 14 may be lodged in the angle 18, formed by the deviation of the barb 8 from the portion of the hook to which it is attached, by applying sufficient force to the hook to increase its normal curvature and bring the barb 8 and eye 9 slightly closer together so that the barb loop 14 may be slipped over the barb. Upon releasing the pressure made thereon the hook will tend to regain its original shape and the guard will be held in the position shown in Figs. 1, 2, 4 and 5. It will be noticed that the bow portion 15 of the guard is bent slightly at 19. This is for the purpose of protecting the point 7 of the hook so that weeds and other substances will glide over the said point without becoming entangled therewith.

Figure 5:
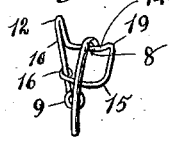

By referring to the plan views, Figs. 1 and 4, and the end view, Fig. 5, it will be seen that the shank 10 is deviated from the middle line and that the prominent, or most elevated parts of the guard are the bend 12 and the portion of the shank adjacent thereto and the part 19 of the bow. Pressure upon one of these prominent points lying at either side of an axial line joining the contacting portion of the barb loop 14 with the eye 9, will tend to rock the guard about said axial line and when so rocked a very slight pressure will suffice to rock or twist the barb loop from its seat and as the loop is leaving the notch 18 the spring of the hook will have a tendency to throw or snap the guard away to one side or the other, depending upon which direction the guard is rocked. As soon as the guard is released the traction of the fish line will carry the guard back to some such position relative to the hook as that shown in Fig. 3, until the stop 16, formed by the attachment of the loop to the shank, engages the upturned eye 11 of said hook.

In Fig. 4 I have shown a modified form of attachment of the said bow to the loop, indicated at 20. This consists in simply coiling the end of the bow tightly about the shank and this coil may be firmly set by compression in the manner common in the art.

Having thus described my invention, what I claim as new, is:—

A fish hook provided with a barb and having an eye bent at an angle with the shank of said hook, and a weed guard slidably engaging said eye, consisting of a wire bent to form a closed loop having a plurality of non-uniform bends therein whereby no two portions of the loop lie in the same plane, one of said bends adapted to engage the barb of the hook.

In testimony whereof I affix my signature in the presence of two witnesses.

JOHN OSMOND.

Witnesses:
C. F. BASSETT,
T. M. POYNTON.